US009152432B2

(12) United States Patent
Cabot et al.

(10) Patent No.: US 9,152,432 B2
(45) Date of Patent: Oct. 6, 2015

(54) SYSTEM AND METHOD TO ACCELERATE ACCESS TO NETWORK DATA USING A NETWORKING UNIT ACCESSIBLE NON-VOLATILE STORAGE

(75) Inventors: Mason Cabot, San Francisco, CA (US); Frank Hady, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1095 days.

(21) Appl. No.: 12/164,165

(22) Filed: Jun. 30, 2008

(65) Prior Publication Data
US 2009/0327683 A1 Dec. 31, 2009

(51) Int. Cl.
*G06F 9/24* (2006.01)
*G06F 9/00* (2006.01)
*G06F 15/177* (2006.01)
*G06F 13/00* (2006.01)
*G06F 9/44* (2006.01)
*G06F 12/08* (2006.01)

(52) U.S. Cl.
CPC .......... *G06F 9/4416* (2013.01); *G06F 12/0866* (2013.01); *G06F 12/0871* (2013.01); *G06F 9/4401* (2013.01); *G06F 9/4406* (2013.01); *G06F 2212/222* (2013.01)

(58) Field of Classification Search
None
See application file for complete search history.

(56) References Cited

U.S. PATENT DOCUMENTS

2005/0283597 A1* 12/2005 Holzmann ........................ 713/2
2006/0143432 A1* 6/2006 Rothman et al. .................. 713/2
2007/0006021 A1* 1/2007 Nicholson et al. ................ 714/6
2010/0299512 A1* 11/2010 Maruyama et al. ............... 713/2

* cited by examiner

*Primary Examiner* — Ji H Bae
(74) *Attorney, Agent, or Firm* — Blakely, Sokoloff, Taylor & Zafman LLP

(57) ABSTRACT

In some embodiments, the invention involves a network controller having a pattern matching unit to identify whether boot file requested from a network accessible storage device for booting are stored locally in non-volatile memory accessible to the network controller. When required boot files are stored locally, the locally stored files are sent to the processor to boot the operating system. In an embodiment, retrieved boot files are automatically cached by the network controller in the accessible non-volatile memory. In other embodiments, a service operates to ensure coherency between locally store boot files and the boot filed stored on the network accessible storage. In another embodiment, data other than boot files may be stored and retrieved from the non-volatile memory. Other embodiments are described and claimed.

25 Claims, 3 Drawing Sheets

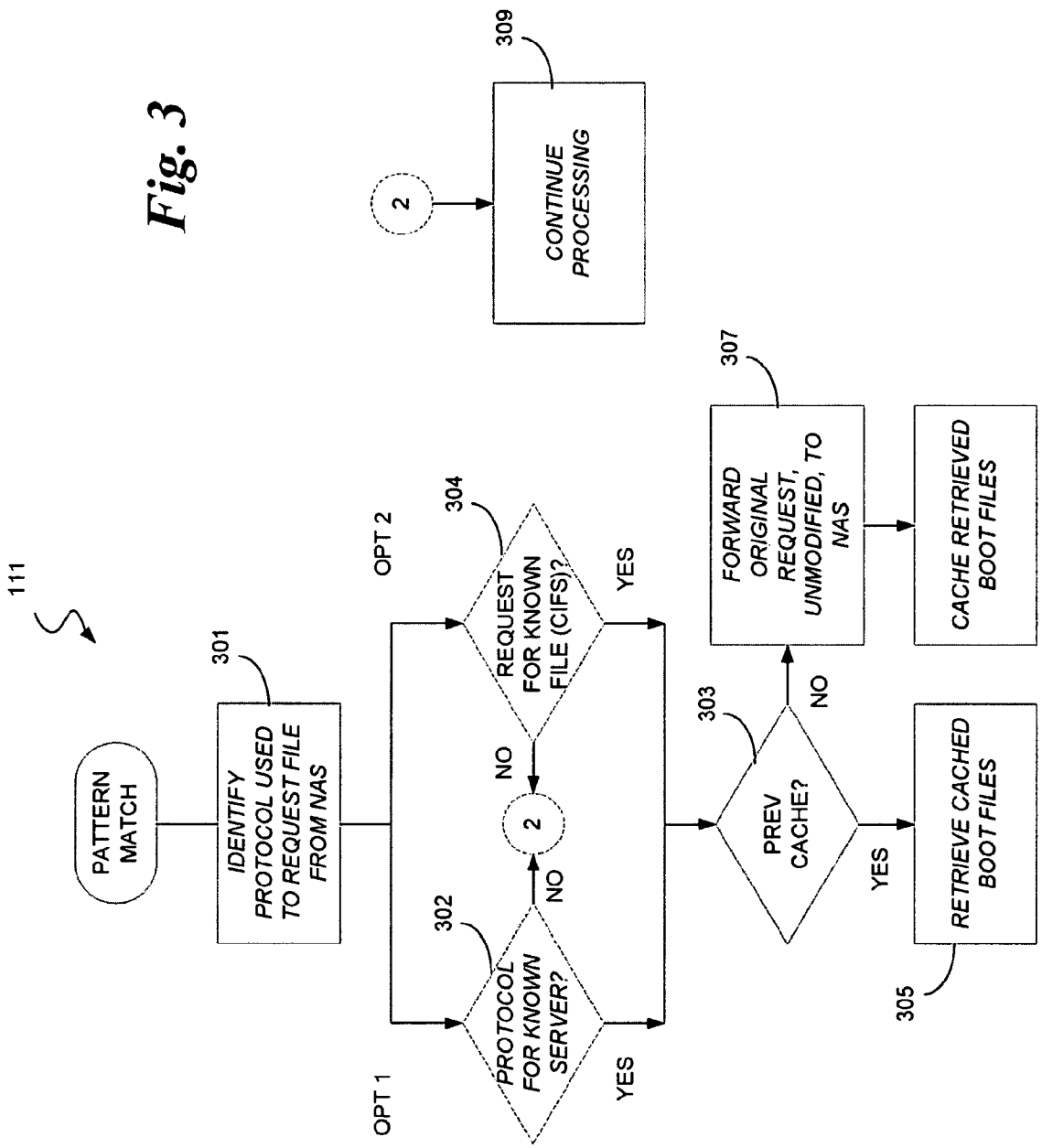

SYSTEM AND METHOD TO ACCELERATE ACCESS TO NETWORK DATA USING A NETWORKING UNIT ACCESSIBLE NON-VOLATILE STORAGE

FIELD OF THE INVENTION

An embodiment of the present invention relates generally to booting of a computing device and, more specifically, to accelerating boot time of a diskless client computing device using non-volatile storage communicatively coupled to the network access device.

BACKGROUND INFORMATION

Various mechanisms exist for booting an operating system (OS) on a computing device. In devices having no disk, or hard drive storage, the OS files must be stored externally, and retrieved during launch of the OS. This type of diskless device may be called a "thin client."

Current diskless client personal computer (PC) devices use network booting to enable diskless operation of the thin client. A minimal amount of data is stored locally on the thin client while the majority of the operating system (OS) boot files are stored remotely on a network accessible device (NAS). The thin client stores enough information in the network interface card (NIC) Option ROM (O-ROM) to start the network and begin fetching OS data, after which all local processing on the thin client is performed on remote data files; the thin client has no bulk storage. Due to the large sizes of modern OSes, for instance the Windows Vista® OS requires approximately 4 GB of data files to boot successfully, network boot performance is limited by network performance. On a 54 Mbit WLAN, network booting the Windows Vista® OS would require nearly 10 minutes of data transfer time (not counting the overhead of network processing). Users expect boot times on the order of seconds, not minutes. Therefore, a more efficient method for booting in a diskless environment is desired.

BRIEF DESCRIPTION OF THE DRAWINGS

The features and advantages of the present invention will become apparent from the following detailed description of the present invention in which:

FIG. 3 is a flow diagram illustrating alternate embodiments of the pattern matching unit.

DETAILED DESCRIPTION

An embodiment of the present invention is a system and method relating to adding a substantial amount of non-volatile memory (NVM) accessible to a thin client's network interface card (NIC). In practice the NVM may be on the NIC or held elsewhere in the platform. The NVM is to be large enough to hold a bootable subset of the operating system (OS) on board the thin client, pinning the bootable subset within the NVM. In general, the NVM may be thought of as a cached, read-only copy of the boot files on a network accessible storage (NAS) device. Any excess NVM may be used as a read-only image of other OS files, application files, or libraries, accelerating performance and reducing network traffic. Embodiments of the invention enable the ability to boot the base OS and use a selection of applications when the network is inoperable, allowing the thin client to still be useful for some basic functionality. In addition to the NVM being accessible to the NIC, the NIC may utilize a basic hardware pattern matching device to interpret outbound boot file requests and translate these into hits or misses to the local NVM.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
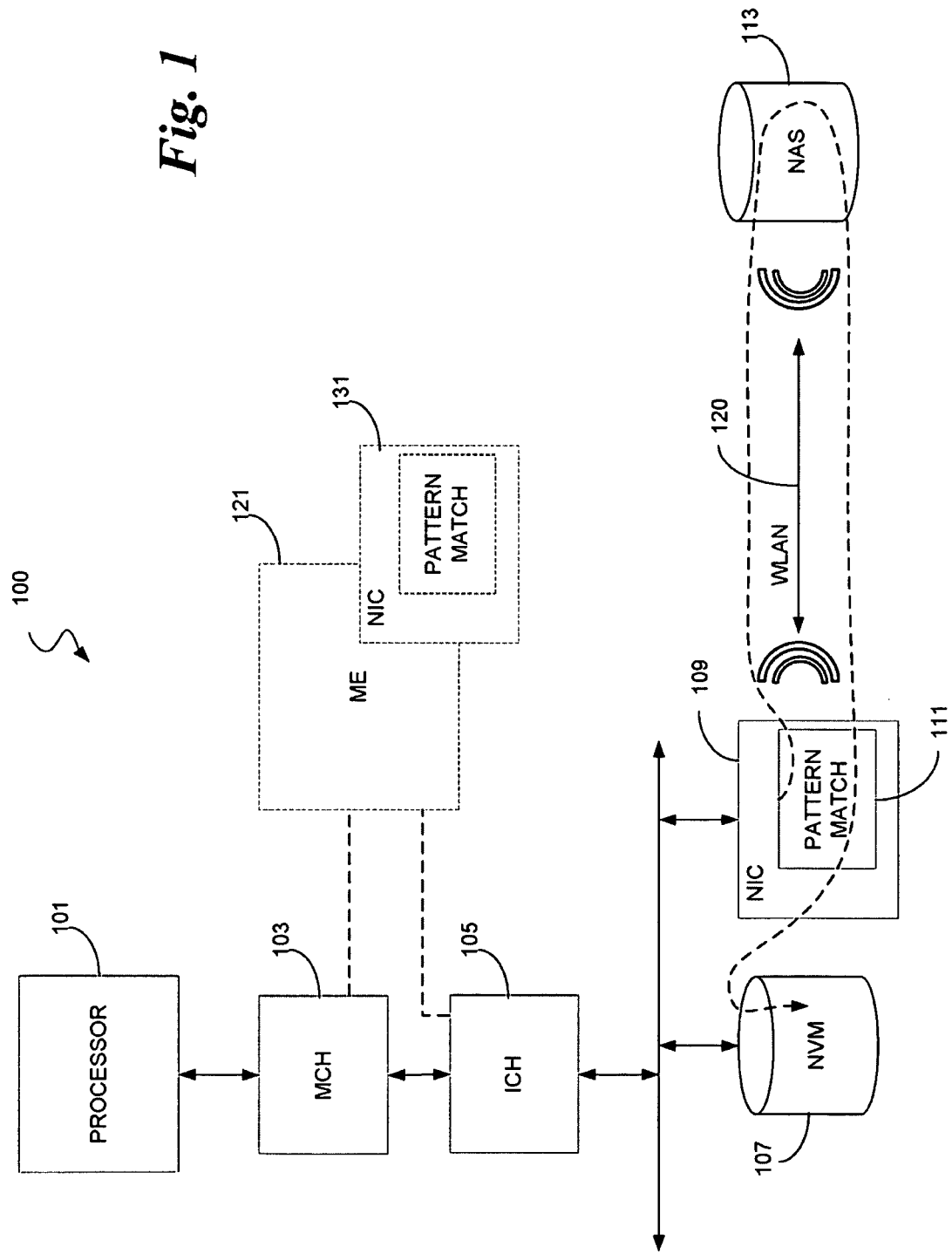
FIG. 1 is a block diagram of a system for using pattern matching hardware to detect storage request on boot, according to an embodiment of the invention.

FIG. 1 is a block diagram of a system for using pattern matching hardware to detect storage request on boot, according to an embodiment of the invention. In an embodiment of the invention, processor 101 communicates with a memory controller hub (MCH) 103, also known as North bridge. The MCH 103 communicates with system memory (not shown). The MCH 103 may also communicate with an advanced graphics port (AGP) via a graphics bus. The MCH 103 communicates with an I/O controller hub (ICH) 105, also known as South bridge. The ICH 105 may be coupled to one or more components such as PCI hard drives, legacy components such as IDE, USB, LAN, and Audio, and a Super I/O (SIO) controller (not shown).

Processor 101 may be any type of processor capable of executing software, such as a microprocessor, digital signal processor, microcontroller, or the like. Though FIG. 1 shows only one such processor 101, there may be one or more processors in platform hardware 100 and one or more of the processors may include multiple threads, multiple cores, or the like. In some embodiments, the processor(s) or cores, may have an integrated memory controller instead of an MCH 103. The processor(s) may be coupled to an input/output hub (IOH) rather than directly to the ICH 105.

Non-volatile memory (NVM) 107, such as Flash memory, may be coupled to the ICH 105 via a low pin count (LPC) bus. In an embodiment, a network interface card (NIC), or other network controller is coupled to the processor 101 via the ICH 105. Although an ICH 105 is shown as illustration, the NIC 109 may be coupled to the processor via an IOH, or a variety of other controller hub types.

In an embodiment, the NIC has access to non-volatile memory (NVM) 107. The NIC 109 has an internal pattern matching unit 111, to be discussed further below. The pattern matching unit 111 may be used to assist the NIC with retrieval and storage of boot files to/from the NVM 107. Boot files are to, at least initially, be retrieved from a network accessible storage (NAS) device 113. The NAS may be coupled to the platform 100 via a wired or wireless local area network (WLAN) 120.

In existing diskless, or thin client systems, a network boot requires boot files, such as the OS loader, to be retrieved from the NAS 113 each time the system is booted. Depending on the bandwidth of the WLAN 120, this boot may take a long time.

Intel® Corp. and Microsoft® Corp. have driven the Pre-boot eXecution Environment (PXE) as the standard protocol for network boot. PXE is essentially an extension to dynamic host configuration protocol (DHCP) that uses trivial file transfer protocol (TFTP) to transfer boot files to the client from the server. Most NICs support this in their Option ROMs. Files transferred from the NAS 113 to the client platform 100 during the PXE requests may be stored and pinned into the NIC's NVM 107 so that the requests may be serviced directly from storage on the client 100. In an embodiment of the invention, the NIC pattern match unit 111 interprets and redirects the PXE commands to serve the requested boot file back to the client processor. In this context, pinning means that the files stored in cache cannot be removed by accident based on caching protocols. Cached files may be selectively pinned, rather than merely stored, based on a set of prioritization rules executed in the NIC.

Figure 2:
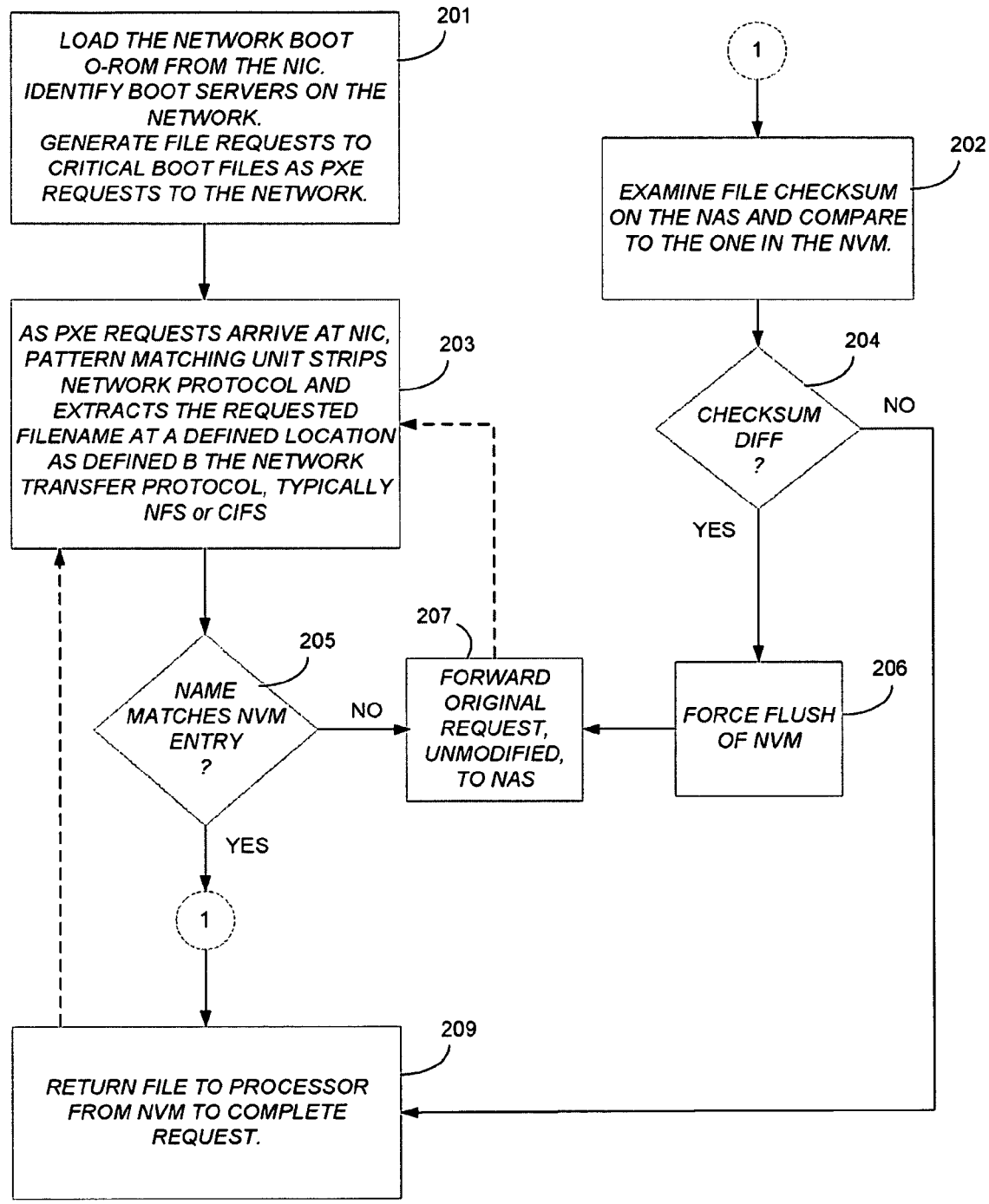
FIG. 2 is a flow diagram illustrating the retrieval and storage of boot files, according to an embodiment of the invention.

FIG. 2 is a flow diagram illustrating the retrieval and storage of boot files, according to an embodiment of the invention. In an embodiment, at startup, the processor loads the network boot Option-ROM (O-ROM) from the NIC, identifies boot servers on the network, and generates file requests to critical boot files as PXE requests to the network, as shown in block 201.

As the PXE requests arrive at the NIC, the pattern match unit strips the network protocol and extracts the requested file name, at a well defined location, as defined by the network file transfer protocol (NFS) of common Internet File system or (CIFS), as shown in block 203 or by the already mentioned TFTP protocol.

It is determined whether the requested file name, file offset and data size matches an entry in the NVM, in block 205. If there is no entry in the NVM matching the request, the original request is forwarded, unmodified, on the network to the NAS, in block 207, to retrieve the file from the NAS. Otherwise, if there is a matching file in the NVM, the requested file data is returned to the processor from the NVM, completing the request, in block 209. The information may even be stored in the NIC accessible NVM as full IP/TFTP packets, obviating the need for any NIC based processing before returning the packets to the booting processor. Processing may continue at block 203 to retrieve subsequent boot files.

Responses returned from the NAS may be recognized by the NIC as critical boot files and stored and pinned into the platform client NVM, at the discretion of the pattern match unit. Files may be pinned as full network packets, ready for immediate return through the NIC at the next request by the processor.

Several alternative embodiments may be implemented, based on the needs of the users. It will be noted that the above example flow does not maintain coherency between the NVM and the NAS. In an embodiment, an additional operation may be inserted after block 205 to help maintain coherency. In an embodiment, when the filename is found in the NVM, as determined in block 205, a file checksum on the NAS is examined and compared with the one in the client NVM, in block 202. If there is a difference in checksums, as determined in block 204, then the NVM is flushed of the out of date boot files, in block 206. The files would then be retrieved from the NAS in block 207, as before, as if they did not exist in the NVM.

Alternately, in another embodiment, a method of pushing updated OS files to the client NVM may be implemented, possibly using multicast to update many clients simultaneously. Similarly, a client application may run shortly after boot time checking the state of the files in the client NVM against those on the NAS and updating any that have changed and rebooting the system.

Alternatively, software running on the processor may compare the NIC accessible NVM stored boot files with those on the NAS after boot. If the NIC accessible NVM resident data is found to be out of date, the software can retrieve the newer files from the NAS and store them in the NIC accessible NVM, making them ready for the next boot of the system.

It should be understood that the NVM may be physically located on the NIC, or elsewhere on the platform, as long as the NVM is accessible to the NIC. In the case where the NVM is physically located on the NIC, system maintenance operations may be performed from a remote management PC without powering up the thin client. Much in the way that Wake-on-LAN operates, the system updates could be pushed into the NIC-resident NVM while the rest of the thin client PC sleeps or is powered off.

A NIC accessible NVM may similarly be used to store executable or library files in a read-only fashion. Here the operation would be very much like the already described accelerated network boot. The NIC pattern matcher unit would again look for accesses to NAS based files which it caches, and return those through the NIC to the CPU as already constructed network packets.

A NIC accessible NVM may also be used as a local network write cache for buffering outbound writes. Since these writes are committed to non-volatile memory they may be considered completed by the client, allowing a client worried about power fail consistency to continue computing, rather than waiting for the NAS to return an acknowledgement (ACK). When the NAS does return an ACK for the packet, the NVM stored copy would be deleted. At power-up the client will need to check the outgoing cache to ensure it is free of packets, or to complete the writes on the packets still stored there. This approach has the advantages of offering better performance for applications writing critical data to the NAS and allowing the client to power down even before its writes over the network have completed, to save power.

FIG. 3 is a flow diagram illustrating alternate embodiments of the pattern matching unit. The pattern match unit 111 may be configured in a variety of ways depending on how the boot files are desired to be cached. In an embodiment, the pattern match unit identifies the protocol used to request files from the NAS, in block 301. In one alternate embodiment, the pattern match unit is configured to identify a protocol, for instance PXE or TFTP, specifically used during boot, to request OS boot files from a NAS. The pattern match unit may be configured to identify a specific server name, known to be utilized for the network boot. It will be understood that a variety of patterns may be configured into the pattern match unit to trigger a capture of the boot files. If the protocol matches the predetermined criteria, as determined in block 302, then a check is made to determine whether the files have been previously cached, in block 303. If the protocol matches and the file has been cached, then the files are retrieved from the NVM in block 305. It should be noted that the cached data may also be a portion of a file, specified by file name, offset and size and not necessarily a full file. If not, the network request is passed along to the NAS, in block 307, to retrieve the files. The retrieved files may then be cached in block 311. If the protocol is not on the list to be cached by the pattern match unit, then processing may continue, as in legacy systems, in block 309. It will be understood that the NVM is of limited size and the totality of boot files may exceed this attached storage. In this case, only a subset of boot files may be predetermined for caching. The pattern match unit may be configured to always retrieve specific files from the NAS, and retrieval of some may be delayed until they are needed during runtime, to reduce boot time.

In an alternative embodiment, the pattern match unit may be configured to recognize specific requests, such as CIFS requests used as a part of computer startup after the diskless client boot loads and starts the kernel, rather than only boot specific network protocols. A CIFS header may be stored in the NIC for use in pattern matching request. Specific filenames may also be stored in the NIC to further customize which files are to be cached. This embodiment is similar to the other previously described, but differs in when the pattern match unit will actually intervene. In this case, if the protocol is identified as being a CIFS retrieval command in block 301, then it is determined whether the file to be retrieved in this command has been identified as one to be cached, in block 304. If it is, then execution flows as before to block 303 to determine whether a cached version of the file exists in NVM. It will be understood by one of skill in the art that the pattern match unit may be configured to recognize boot server names, boot file request protocols, or an other level of information that may be used to recognize that the NIC is to retrieve data from the NAS. Access lists and predetermined rules governing when files should be retrieved from the NAS by default, or whether an attempt should be made to retrieve the file from cache may be stored on the NIC accessible NVM.

In some cases, the protocol, such as PXE or TFTP, may indicate that the entire boot file should be cached or retrieved from cache, just by virtue of the TFTP request. In other cases, the request itself is parsed and a specific file name is matched in the pattern match unit based on a fetch request. The network protocols may be stripped from the file, or stored with the file in cache, based on the configuration of the pattern match unit. Headers may be reconstructed by the NIC so that when files are retrieved from the NVM, the appear to have come directly from the NAS, via the NIC.

In the case where the platform has not yet been booted, all boot files must be retrieved from the NAS. Support software in the BIOS or the Operating system, for instance, may be utilized to cache the first instance of the boot files into the NVM. In another embodiment, the first boot will operate as a legacy network boot so that caching will not slow the first boot. Support software may execute during runtime and based on the known location for future boots, will retrieve and cache the network filed, as necessary, so that they will be available in NVM during subsequent boots.

Embodiments of the invention may use a hybrid of the two alternatives illustrated in FIG. 3. In the first boot case, the TFTP protocol may be identified to retrieve the entire boot file and put it into cache. A subset of critical files may be stored in the NVM so that subsequent boots only retrieve selected files from the NVM or from the NAS. In some embodiments, different files are retrieved using different protocols, so that both protocol identification methods are used throughout boot until runtime. For instance, once the file system is loaded during boot, individual files may be retrieved from the NAS, rather than a single image.

Referring again to FIG. 1, in another embodiment, a manageability engine (ME) 121 may be reside on the platform, for instance, running Intel® Active Management Technology (iAMT). The NIC 131 may be coupled to the ME microprocessor, and may be in the communication path between the processor and the hard drive. The ME may be coupled to the MCH 103 or the ICH 105, or to an IOH (not shown). It will be understood that the ME may be coupled to a different communication path in processors of various architectures. The ME may have access to a secure partition if the processor boot flash (no shown) which may be used as the NVM. In cases where the processor is to boot from a hard drive, the ME may capture the boot request and boot from cache or a NAS instead, under certain circumstances. In another embodiment, the NIC may be coupled or reside within the ICH. For purposes of embodiments to the present invention, the as long as the NIC has access to NVM and is used to access OS boot files from the NAS, it is unimportant to which device(s) it is coupled on the platform.

In another embodiment, the NIC may recognize when a CIFS request is being made and automatically store the packets regardless of the filename of the requested packet. The NIC will store the request protocol so that when an identical request is made in a subsequent boot, the proper packet it retrieved from the NVM cache.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for accelerating network data requests, comprising:
    a processor communicatively coupled to a network controller to generate a plurality of file requests each for an operating system boot file to boot an operating system;
    the network controller receiving the plurality of requests for the boot files, the network controller having access to non-volatile memory (NVM) for storing a plurality of operating system boot files locally, wherein the network controller is configured to selectively retrieve the requested operating system boot files from a remote network accessible storage (NAS) device and the local non-volatile memory at boot time to boot an operating system on the processor; and
    the network controller further comprising a pattern matching unit configured to identify requests to the remote network accessible storage to retrieve boot files necessary to boot the operating system, and to selectively retrieve requested boot files from the local NVM instead of the remote NAS when the requested boot files are identified as having been stored in the local NVM, and to retrieve the requested boot files from the remote NAS when the requested boot files are not present in the local NVM,
    the pattern matching unit to identify requested boot files as boot files that have been stored in the local NVM by an extraction of a file name, file offset, and data size for each requested boot file, and then by a determination of whether the extracted file name, file offset, and data size match an entry in the local NVM.

2. The system as recited in claim 1, wherein the network controller is further configured to store boot files retrieved from the remote network accessible storage in the local non-volatile memory to be used in subsequent operating system boots.

3. The system as recited in claim 2, wherein a header associated with a boot file retrieved from the NAS is stripped from the boot file by the network controller before storing the boot file in the local no memory.

4. The system as recited in claim 1, further comprising a service to retrieve boot files from the remote network accessible storage during runtime and store the retrieved boot files in the non-volatile memory for use in subsequent operating system boots.

5. The system as recited in claim 1, wherein the pattern matching unit is further configured to identify a protocol used in the request to the remote network accessible storage and selectively retrieve either an entire boot image or a selected boot file or a partial boot file from one of the remote network accessible storage and the local non-volatile memory, based on the identified protocol.

6. The system as recited in claim 5, wherein the protocol identified is one of a preboot execution environment (PXE), trivial file transfer protocol (TFTP) and common Internet file system (CIFS) request protocol.

7. The system as recited in claim 1, wherein the network controller further comprises an option-read-only memory to identify at least one boot server on a network, wherein operating system boot files to boot the operating system on the processor reside on the network accessible storage device on the network.

8. The system as recited in claim 1, wherein the pattern matching unit of the network controller is further configured to identify requested boot files as boot files that have been stored in the local NVM by a retrieval of a first identifier of the requested boot file residing on the NAS and comparing the first identifier to a second identifier corresponding to a boot file stored in the non-volatile memory, wherein when the first and second identifiers match, the corresponding boot file stored in the local non-volatile memory is retrieved for booting, and if the first and second identifier do not match then the network controller is to retrieve the requested boot file from the NAS for booting.

9. The system as recited in claim 8, wherein the first identifier is one of a checksum and a version number.

10. The system as recited in claim 8, wherein the network controller is further configured to store the retrieved boot file in the local non-volatile memory when the first and second identifiers do not match, to be used for subsequent boots.

11. The system as recited in claim 1, wherein higher priority hoot files are pinned to the local non-volatile memory such that lower priority boot files cannot overwrite the higher priority boot file.

12. The system as recited in claim 1, wherein the network controller is further configured to store network packets retrieved during previous boots from the remote network accessible storage in the local non-volatile memory to be used in subsequent operating system boots.

13. The system as recited in claim 1, wherein the network controller is configured to buffer outgoing write requests in the local non-volatile memory, the processor being capable of being powered off or put into sleep mode, before the outgoing write requests are sent out via the network controller.

14. The system as recited in claim 1, wherein the network controller is configured to selectively retrieve requested files from one of the remote network accessible storage and local non-volatile memory after the operating system has launched.

15. A method for accelerating network data requests, comprising:
   generating a plurality of file requests each for an operating system boot file to boot an operating system;
   receiving the plurality of file requests by a pattern matching unit in a network controller, the network controller communicatively coupled to a local non-volatile memory (NVM) storage;
   determining by the pattern matching unit whether each requested boot file is stored in the local non-volatile memory by extracting a file name, file offset, and data size for each requested boot file, and then determining whether the extracted file name, file offset, and data size match an entry in the local NVM;
   when the requested data is stored in the local non-volatile memory, then retrieving the requested boot file from the local non-volatile memory, and when the requested boot file is not stored in the local non-volatile memory, retrieving the requested data from a remote network accessible storage (NAS) device; and
   returning the retrieved requested boot file to a processor.

16. The method as recited in claim 15, further comprising:
   when the requested boot file is retrieved from the remote network accessible storage device, storing the retrieved boot file in the local non-volatile memory for use in subsequent requests for the requested boot file.

17. The method as recited in claim 15, wherein the requested boot the contains one of a partial boot file, a boot image, and a partial boot image, the boot file being necessary for the processor to boot, before an operating system is launched.

18. The method as recited in claim 15, wherein the requested boot file is a file or partial file, the boot file to be used during runtime, after an operating system is launched.

19. The method as recited in claim 15, further comprising:
   retrieving a first identifier of the requested boot file and comparing the first identifier to a second identifier corresponding to a boot file stored in the local non-volatile memory, wherein when the first and second identifiers match, retrieving the corresponding boot file stored in the local non-volatile memory for booting, and when the first and second identifier do not match then retrieving the requested boot file from the remote network accessible storage for booting.

20. The method as recited in claim 19, wherein the first identifier is one of a checksum and a version number.

21. The method as recited in claim 19, further comprising:
   storing retrieved boot files in the local non-volatile memory when the first and second identifiers do not match, to be used for subsequent boots.

22. The method as recited in claim 15, further comprising:
   storing by the network controller network packets retrieved during previous boots from the remote network accessible storage device in the local non-volatile memory to be used in subsequent operating system boots.

23. The method as recited in claim 15, further comprising:
   buffering by the network controller outgoing write requests in the local non-volatile memory, the processor being capable of being powered off or put into sleep mode before the outgoing write requests are sent out via the network interface card.

24. The method as recited in claim 15, further comprising:
   selectively retrieving by the network controller requested boot files from one of the remote network accessible storage and local non-volatile memory after the operating system has launched.

25. The method as recited in claim 15, further comprising:
   in response to a request to cache data, storing selective boot files retrieved from the remote network accessible storage device in the local non-volatile memory by the network controller, wherein the request to cache a boot file is received at either boot time or during runtime.

* * * * *